March 6, 1962  HIDEYA KOBAYASHI  3,023,683
CAMERA EQUIPPED WITH AN EXPOSURE METER
Filed March 25, 1958  2 Sheets-Sheet 1
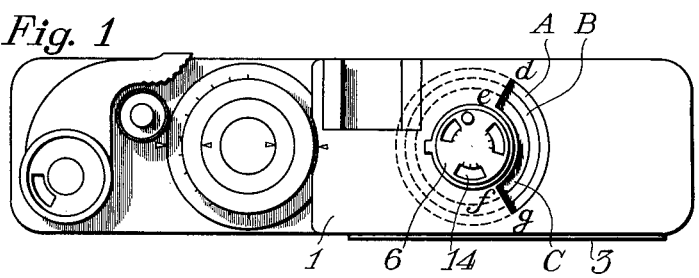
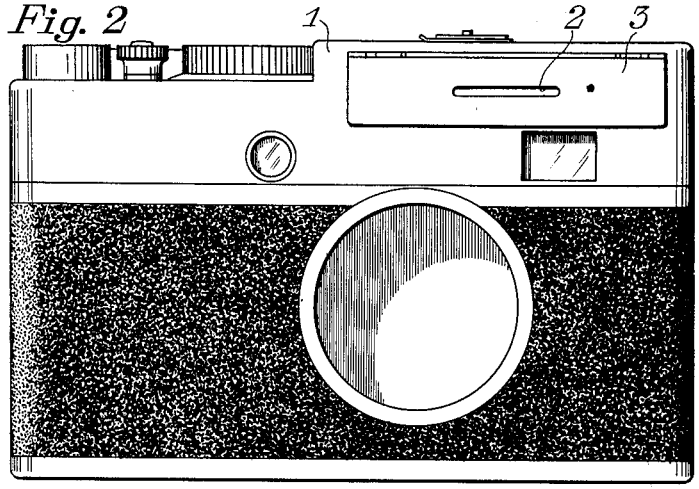
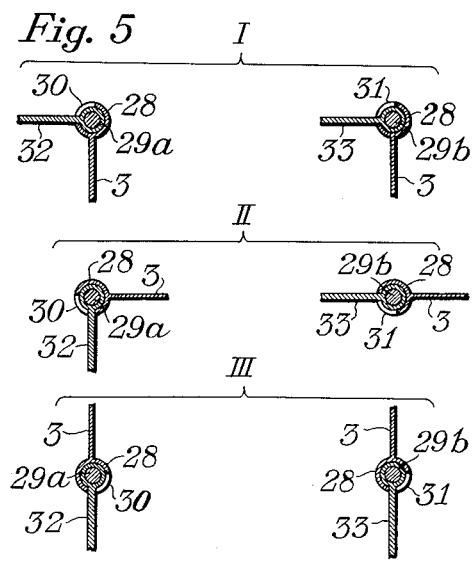
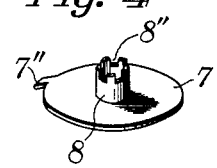

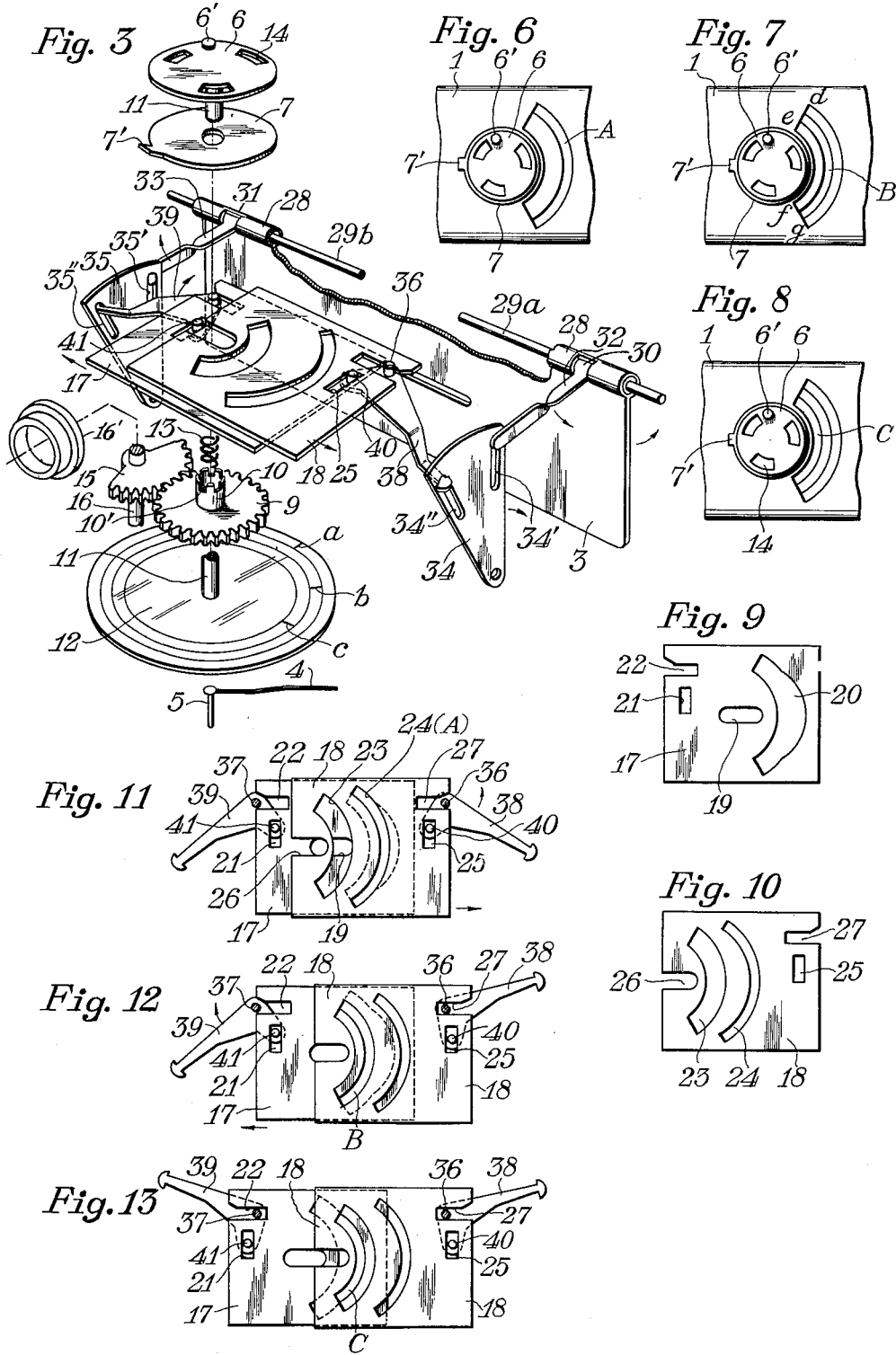

3,023,683
CAMERA EQUIPPED WITH AN EXPOSURE METER
Hideya Kobayashi, 27 Nagasaki-cho 1-chome,
Toshima-ku, Tokyo, Japan
Filed Mar. 25, 1958, Ser. No. 723,751
Claims priority, application Japan Sept. 16, 1957
6 Claims. (Cl. 95—10)

This invention relates to a photographic camera, particularly a miniature camera, equipped with a built-in exposure meter and adapted to automatically determine a combination of the lens aperture and the shutter time for the exposure according to the brightness of the object.

In a camera equipped with a light-value shutter and an exposure meter, it has been proposed to arrange the shutter and the exposure meter in such manner that, when the camera is held facing toward an object and, with a movable element moved to the position in coincidence with a position of the pointer of the exposure meter, a light-value ring of the light-value shutter is actuated according to the degree of displacement of said movable element, a desired combination of the $f$-value of the lens aperture and the shutter time corresponding to the light value of the object may be obtained. However, in view of the fact that the brightness of an object varies over a wide range, it is customary to vary the light receiving area of the exposure meter built in the camera, or to add a booster so as to vary the photoelectric current generated in the exposure meter. In this case, inasmuch as the amount of deviation of the pointer varies also for the given brightness of the object, the above mentioned method of determining the combination of the lens aperture and the shutter time could not be carried into practice, unless some compensating means is interposed. The object of the present invention is to provide a camera equipped with an associated exposure meter, in which is provided a novel compensating means adapted for a miniature camera mechanism.

The invention will now be described with reference to the accompanying drawings, in which:

FIGURE 1 is a plan view of a camera constructed according to this invention;

FIGURE 2 is a front view thereof;

FIGURE 3 is an exploded perspective view of the mechanism forming the essential part of the invention;

FIGURE 4 is an inverted perspective view of a disc bearing the scale indicating the sensitivity of the film;

FIGURE 5 shows in cross section a hinged lid for limiting the amount of light entering the exposure meter and arms secured to said lid, shown in various angular positions thereof;

FIGURES 6 to 8 show in plan views the variation of the indication seen through a window in the top plate of the camera casing;

FIGURE 9 is a plan view of a lower sliding mask plate having an arcuate slot;

FIGURE 10 is a plan view of an upper sliding mask plate; and

FIGURES 11 to 13 are plan views of the said lower and upper sliding mask plates superposed, showing three displaced relative positions thereof.

The top 1 of the camera casing is provided on its front with a light receiving window normally covered by a hinged lid 3 having a slit 2 for limiting the amount of light received by the exposure meter. The exposure meter per se is not herein shown or described in detail as it forms no part of the present invention and may be of any usual construction. A pointer 4 of the exposure meter is adapted to rotate in a horizontal plane around a vertical axis 5. On the top plate of the camera casing, there is a sector like arcuate slot having its center of curvature on the extension of said axis 5, said arcuate slot having four corners $d$, $e$, $f$ and $g$. Also on said top plate, there are two discs 6 and 7, their centers being in coincidence with the center of curvature of said arcuate slot. The lower disc 7 has a projection 7' integral with and projecting from its periphery, which projection projects beyond the periphery of the upper disc 6. As shown in FIGURE 4, the lower disc 7 has on its lower side a concentric sleeve 8 fixed thereto and having a plurality of teeth 8". Said sleeve 8 passes loosely through a hole in the top plate of the camera casing, and meshes with teeth 10' formed on the upper end of a concentric sleeve 10 on a gear 9 rotatably mounted in the camera casing, so that the lower disc 7 may be axially moved relative to said gear 9 but it may be rotated in unison with said gear 9. An integral axis 11 depending from the upper disc 6 loosely passes through said sleeves 8 and 10, and its lower end is fixed to the center of a disc 12 made of transparent material. In practice, the radius of curvature of the outer periphery of said disc 12 is preferably so chosen that it is somewhat larger than the radius of curvature of the arc $d$–$g$ of the above mentioned arcuate slot formed on the top of the camera casing. Herein, however, it is assumed that both radii of curvature are equal, for the sake of convenience. Between the inner walls of the sleeves 8 and 10 and the outer surface of the axis 11, there is a coil spring 13 wound around said axis 11, the inner edges of the central bores of the disc 7 and of the gear 9 being biased by the ends of said spring 13, so that the upper face of the lower disc 7 is biased against the lower face of the upper disc 6 which is superposed upon the lower disc 7. The upper peripheral portion of the lower disc 7 has a scale (not shown) indicating the sensitivity of the photosensitive film. Said scale or graduation is visible through a small arcuate window slot 14 formed on the upper disc 6. On the inner edge of said arcuate window slot, there are a plurality of marks representing the filter factors. In the embodiment illustrated in the drawing, there are three identical arcuate window slots, each alotted for ASA value, DIN value, etc. Meshing with the gear 9, there is a sector gear 15, of which axis 16 is associated with a suitable conventional mechanism for rotating the light-value ring 16' of the light-value shutter diagrammatically illustrated in FIG. 3.

Now, it is assumed that the area of the light receiving window of the exposure meter is constant and that there is not provided any booster. The upper and lower discs 6 and 7 are rotated relative to each other by pressing the projection 7' on the lower disc 7 by means of a finger of one hand and actuating the projection 6' on the upper disc 6 by means of a finger of the other hand, so as to bring the desired filter factor mark into coincidence with the desired scale of the sensitivity of the sensitive film charged in the camera. By such manual operation, the gear 9 and the transparent disc 12 are set into the relative angular position determined by said adjustment. Now, the camera is held facing the desired object, whereby the pointer of the exposure meter will be swung according to the brightness of the object and will stop in the given position. By viewing one of the circumferentially arranged indicator marks on the transparent disc 12 through the arcuate slot $d$—$e$—$f$—$g$, the light-value ring of the light-value shutter is rotated, thereby to rotate the sector gear 15 and the gear 9. Accordingly, the transparent disc 12 which is in frictional engagement with the gear 9 is also rotated, thereby bringing a single indicator mark on the disc 12 into coincidence with the pointer 4 of the exposure meter, so that the above mentioned light-value ring of the light-value shutter will be set in the desired position corresponding to the brightness of the object. By such measure, the combination of the lens aperture and the shutter time suited for the necessary and adequate exposure may be obtained.

Underneath the arcuate view window in the top plate of the camera body, there are two mask plates 17 and 18 (FIGURES 9 and 10) which are slidable relative to each other in predetermined direction in a horizontal plane. The mask plate 17 has an oblong slot 19 centrally arranged in the direction of the sliding movement, through which slot the sleeve 8 or 10 passes loosely. The mask plate 17 has also an arcuate slot 20, a short transverse slot 21 and a longitudinal recess 22. The mask plate 18 has two arcuate slots 23 and 24 of different radial widths, a short transverse slot 25, and two longitudinal recesses 26 and 27. Said recess 26 loosely engages with the sleeve 8 or 10 and serves as a guide for the sliding movement of the mask plate 18. When said two mask plates 17 and 18 are in the superposed position as shown in FIGURE 11, the slots 20 and 24 are in register, and the whole configuration of the slot 24 forms the aperture common to both plates 17 and 18. This zone of common aperture is designated by the reference A in FIGURE 11. This arcuate zone (FIGURE 6) corresponds with the outermost arcuate zone A as viewed from the arcuate view window in the top plate of the camera body as shown in FIGURE 1. When the upper mask plate 18 is shifted rightwardly relative to the lower mask plate 17 as shown in FIGURE 12, the outer half of the arcuate slot 23 of larger radial width will register with the inner half of the arcuate slot 20, thereby forming the common aperture zone B. This zone corresponds with the intermediate zone B adjacent to the outer zone A as shown in FIGURE 1, and in FIGURE 7. When the lower mask plate 17 is shifted leftwardly relative to the upper mask plate 18, the inner half of the arcuate slot 23 in the mask plate 18 will register with the outer half of the arcuate slot 20 in the mask plate 17, forming the common slot C. This zone corresponds with the zone C adjacent said zone B, as shown in FIGURE 8.

The light limiting lid 3 hinged to one edge of the light receiving window of the exposure meter has tubular portions 28 integral therewith, and through which a shaft 29 is inserted. Said shaft 29 is divided at the midpoint into two shafts 29a and 29b. The said tubular portions 28 are provided with recesses 30 and 31 respectively, each recess extending for an angle of 90°. Two arms 32 and 33 fixed to the shafts 29a and 29b, respectively, protrude through said recesses 30 and 31, respectively. The lid 3 having the slit 2 is normally held in the depending closed position by means of a latch (not shown). When released, said lid 3 is turned forwardly and upwardly into a horizontal position under the action of a spring (not shown). As usual a booster known in the art may be provided when the potential produced by the light received through the whole area of the light receiving window is insufficient to move the pointer of the exposure meter. In such case, it is so designed that said booster can not be mounted to the camera, unless the said lid 3 is turned upwardly through an angle of 180° from its normal position into the vertical position. The hinge shaft 29a for the lid plate 3 and the arm 32 fixed thereto are given a tendency to be turned in the direction of the arrow shown in FIGURE 3 by means of a spring (not shown), but the arm 32 is held in its horizontal position by virtue of an edge of the recess 30 in the tubular portion 28 when the lid 3 is held in its closed position, as shown in FIGURE 5, I, lefthand figure. On the other hand, the hinge shaft 29b and the arm 33 fixed thereto are given a tendency to be turned in the direction of arrow shown in FIGURE 3 by means of a spring (not shown), but the arm 33 is normally held in its horizontal position by virtue of the top of the housing of the exposure meter when the lid 3 is in its closed position, as shown in FIGURE 5, I, righthand figure. The positions of the arms 32 and 33 relative to the lid 3 as assumed when the lid is turned upwardly into horizontal position are shown in FIGURE 5, II, lefthand figure, and FIG. 5, II, righthand figure, respectively. When the lid 3 is further turned to its upright position, which is required when the booster is employed, the positions of the arms 32 and 33 relative to the said lid are shown in FIGURE 5, III, lefthand figure, and FIGURE 5, III, righthand figure, respectively. It is to be noted that in such a case the tendency of the arm 32 to turn further is prevented and it is held in its vertical depending position by means of a sector 34 connected to the free end of the arm, as will be described hereinafter.

In the housing of the exposure meter, there are provided rocking sectors 34 and 35 pivotally mounted to the side walls. The sector 34 has radial guide slots 34' and 34" adjacent the side edges thereof, and similarly the other sector 35 has radial guide slots 35' and 35" adjacent the side edges thereof. Each of the arms 32 and 33 has on its free end a pin. The pin on the arm 32 is loosely inserted into the guide slot 34' of the sector 34, and the pin on the other arm 33 is loosely inserted into the guide slot 35' of the other sector 35. On the other hand, in the housing of the exposure meter there are provided bell crank levers 38 and 39 pivotally mounted and adapted to oscillate around vertical studs 36 and 37, respectively. Pins 40 and 41 on the short arms of the levers 38 and 39, respectively, are loosely engaged by the aforementioned transverse slots 25 and 21 in the upper mask plate 18 and the lower mask plate 17, respectively. The other arms of the levers 38 and 39 are bent and their free ends are loosely inserted in and engaged by the guide slots 34" and 35" of the sectors 34 and 35, respectively.

When the lid 3 for limiting the light passing through the light receiving window of the exposure meter is held in its closed position as shown in FIGURE 5, I, the superposed two mask plates 17 and 18 are held in the position as shown in FIGURE 11. When the said lid 3 is turned forwardly and upwardly as shown in FIGURE 5, II, the upper mask plate 18 only will be shifted rightwardly into the position shown in FIGURE 12 through the action of the arm 32, the rocking sector 34 and the lever 38. In the event that said lid 3 is further turned upwardly into its upright position in the case of employment of the booster, the lower mask plate 17 only will be shifted leftwardly into the position shown in FIGURE 13 through the action of the arm 33, the rocking sector 35 and the lever 39.

On the transparent disc 12 which is located above the pointer 4 of the exposure meter, there are three marks a, b and c arranged at radially and circumferentially different points. The mark a is visible through the outermost arcuate slot zone A in the camera casing; the mark b is visible through the middle arcuate slot zone B; and the mark c is visible through the innermost arcuate slot zone C, so that either one of the said marks may be brought into register with the pointer 4 through the rotation of the transparent disc 12 and through the selection of either one of the arcuate slot zones A, B and C.

The operation of the invention is as follows: As described above, the position of the disc 6 relative to the gear 9 is adjusted according to the sensitivity of the film and the filter factor. Then, the camera is held facing the object with the light-limiting lid 3 of the exposure meter closed, when the brightness of the object is high. In this case, through the arcuate view window d—e—f—g in the top plate 1 there will be visible the pointer 4 and the mark a only through the outermost arcuate slot zone A. The light-value ring of the light-value shutter is rotated until the said mark a is brought into register with the pointer 4, so that a combination of the lens aperture and shutter time adapted for the proper exposure may be obtained. Similarly, for a medium brightness of the object, the lid 3 is turned forwardly into horizontal position, thereby the pointer 4 and the mark b will become visible only through the middle arcuate slot zone B in the view window. Then employing the booster with the said lid 3 held in its upright position as when the object is relatively dark, there will be visible the pointer 4 and the mark c only through the innermost arcuate slot zone C. Then, said mark b or c is brought into register with the pointer 4 in the similar manner as above described in the case of the brightest object, whereupon the shutter is released upon selecting the desired combination of the lens aperture and shutter time in usual manner well known in the art.

According to the present invention, it will be noted that the adjustment of the amount of light received by the exposure meter and the setting of the shutter are automatically effected in interconnected manner, so that the lens aperture and shutter time may readily be determined for a wider range of the brightness of the object. The above mentioned interconnecting mechanism may be provided in close proximity of the exposure meter, so that the invention may be conveniently applied to a miniature camera.

What I claim is:

1. In a photographic camera having a light-receiving window to receive light from a subject to be photographed, an exposure meter provided with an indicating element whose indications correspond to variations of light received from the subject to be photographed, and a light-valve shutter, in combination, means for setting the light-valve shutter at suitable aperture openings compensating for the light received from the subject to be photographed comprising, a light-shield operable at will to a plurality of positions to control and vary the effective light-receiving area of said window to vary the amount of light received by the exposure meter, an angularly displaceable disc having indicator marks disposed radially from a common point at different radial distances in different angular positions and being displaceable to positions of coincidence between the individual marks and the exposure meter indicating means, means operable at will to displace the disc and place the marks thereon individually in coincidence with the exposure meter indicating element, viewing means operable by the light-shield into different positions for viewing the indicator marks separately and individually when disposing them in coincidence with said indicating element, said last mentioned positions correspondng to individual ones of the first mentioned positions of the light-shield and corresponding to positions in which only one of the marks is viewable for a given position of the viewing means, and means operatively connecting the displaceable disc with the light-value shutter.

2. In a photographic camera having a light-receiving window to receive light from a subject to be photographed, an exposure meter provided with an indicating element whose indications correspond to variations of light received from the subject to be photographed, and a light value shutter, in combination, means for setting the light-value shutter at suitable aperture openings compensating for the light received from the subject to be photographed comprising, a light-shield operable to a plurality of positions to control and vary the effective light receiving area of said window to vary the amount of light received by the exposure meter, a displaceable disc having indicator marks disposed radially from a common point at different radial distances in different angular positions and being displaceable to positions of coincidence between the individual marks and the exposure meter indicating means, means to displace the disc and place the marks thereon individually in coincidence with the exposure meter indicating element, viewing means operable by the light-shield into different positions for viewing the indicator marks separately and individually when disposing them in coincidence with said indicating element, said last mentioned positions corresponding to individual ones of the first mentioned positions of the light-shield and corresponding to positions in which only one of the marks is viewable for a given position of the viewing means, and means operatively connecting the displaceable disc with the light-value shutter.

3. In a photographic camera according to claim 2, in which said exposure meter is built into the camera and is provided with a window, said light-shield comprising a pivotally mounted member positionable overlying the window and in an angular position normal to the window shading it and to a position extending upwardly completely exposing the window.

4. In a photographic camera according to claim 2, in which said viewing means comprises a pair of plates disposed one overlying the other and having slots thereon positionable by the light-shield in positions of registry for viewing only one of the indicator marks at a time.

5. In a photographic camera according to claim 4, in which an upper one of said plates is provided with two spaced slots and a lower plate is provided with a single slot.

6. In a photographic camera according to claim 5, including means operably connecting the plates for movement in opposite directions for placing the two slots in proper registry with said one slot.

References Cited in the file of this patent

UNITED STATES PATENTS

| 2,209,156 | Fischer | July 23, 1940 |
| 2,222,292 | Gorlich | Nov. 19, 1940 |

FOREIGN PATENTS

| 434,042 | Great Britain | Aug. 26, 1935 |
| 942,132 | Germany | Apr. 26, 1956 |